United States Patent [19]
Wise et al.

[11] 4,205,246
[45] May 27, 1980

[54] EXPLOSION RESISTANT OVERLOAD AND RELAY MOUNTING FOR EXPLOSION RESISTANT MOTOR

[75] Inventors: Kennard L. Wise, Tecumseh; George H. Schroeder, Clinton, Mich.

[73] Assignee: Tecumseh Products Company, Tecumseh, Mich.

[21] Appl. No.: 887,618

[22] Filed: Mar. 17, 1978

[51] Int. Cl.² ........................................... H02K 11/00
[52] U.S. Cl. ................................. 310/68 C; 310/71; 310/88
[58] Field of Search .................. 310/68 R, 68 C, 71, 310/87, 88

[56] References Cited

U.S. PATENT DOCUMENTS

| | | | |
|---|---|---|---|
| 2,318,076 | 5/1943 | Johns | 310/68 C X |
| 2,368,492 | 1/1945 | Ralston | 310/88 |
| 2,523,059 | 9/1950 | Richert et al. | 310/68 C |
| 2,590,559 | 3/1952 | Miller | 310/71 |

*Primary Examiner*—Mark O. Budd
*Attorney, Agent, or Firm*—Albert L. Jeffers

[57] ABSTRACT

An explosion resistant motor has a metal casing with a cluster of electrical terminals extending from a wall thereof and sealed thereto. A section of metal pipe has one end welded to the casing wall and surrounds the terminal cluster. A metal clip mounts an inherent thermal overload device in the open end of the pipe. A positive temperature coefficient resistance starting relay in the pipe is coupled between one motor terminal and one overload terminal. Electrical leads are connected to another motor terminal and another overload terminal and extend out of the pipe through a conduit welded to the wall thereof. A pipe cap is threaded on the open end of the pipe to complete an explosion resistant enclosure for the overload and starting relay, and also to secure the overload in place.

11 Claims, 5 Drawing Figures

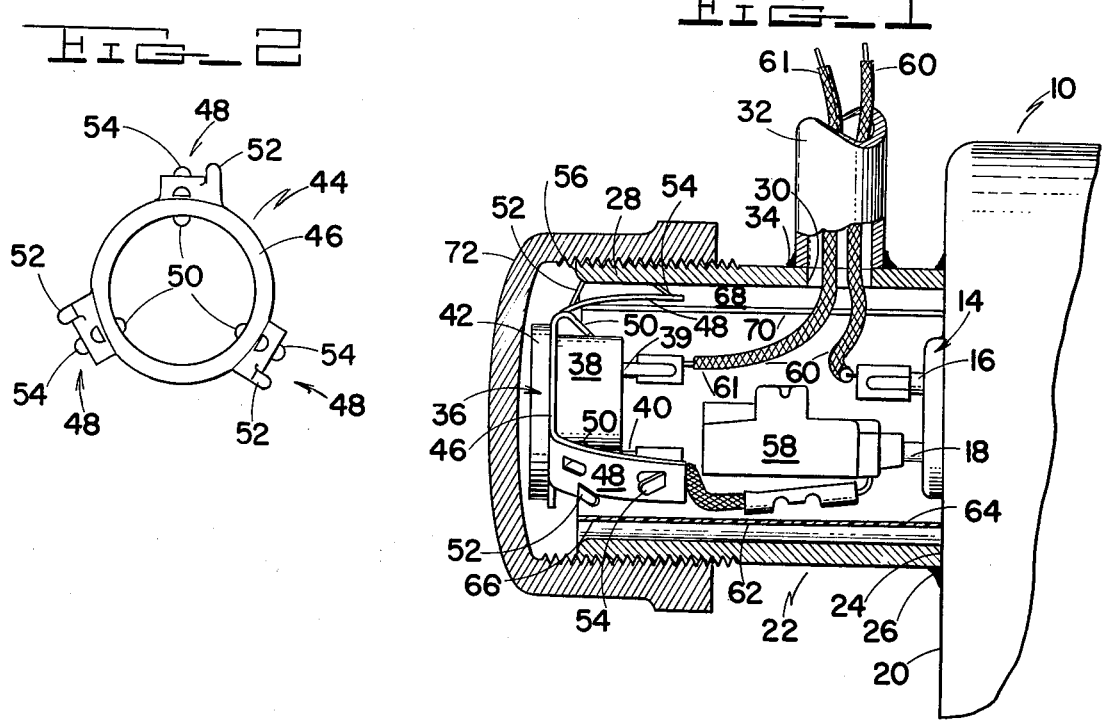
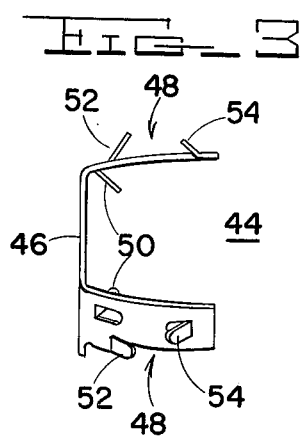
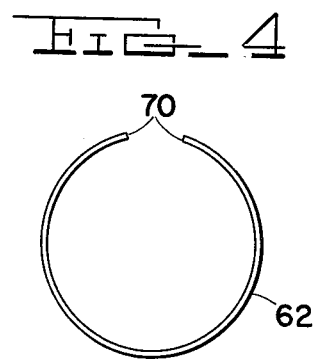

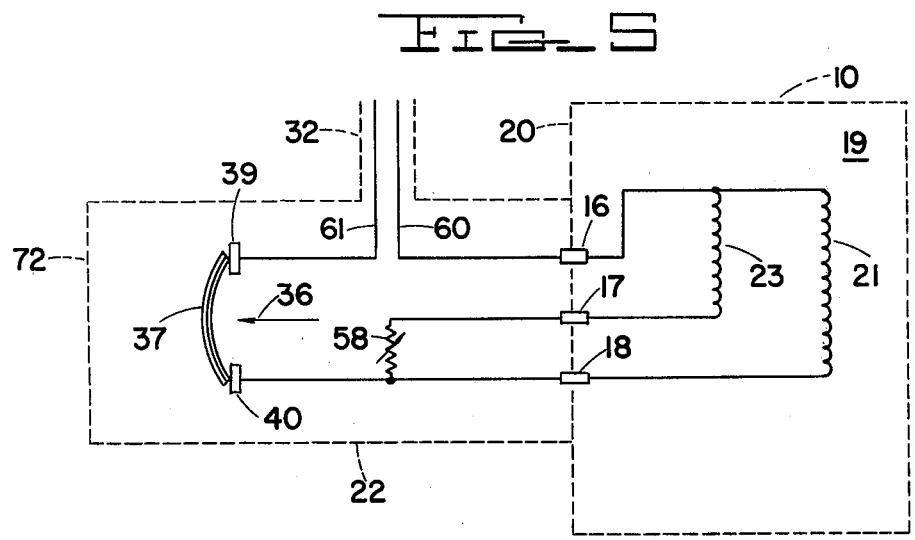

EXPLOSION RESISTANT OVERLOAD AND RELAY MOUNTING FOR EXPLOSION RESISTANT MOTOR

BACKGROUND OF THE INVENTION

1. Field of the Invention

This invention relates generally to overload protection and starting relays for explosion resistant motors, and more particularly to an explosion resistant mounting for an inherent thermal overload device and starting relay for an explosion resistant hermetic motor.

2. Description of the Prior Art

Conventional hermetic motors which drive a refrigeration compressor with the compressor and motor being hermetically sealed in a common enclosure may have a thermal overload device and, in the case of single phase motors, a starting relay mounted on the casing. There are instances, however, where an explosion resistant compressor system is required for use in a hazardous atmosphere, such as in hospitals. In any explosion resistant or hazardous duty application, electrical contacts and any electrical connection which can become loosened must be housed in an explosion resistant enclosure. In prior explosion resistant refrigeration motor-compressor systems, a current-responsive overload device and, in the case of single phase systems, a motor starting relay has been remotely located in a non-explosive environment, and connected to the hermetic motor by leads enclosed in rigid pipe welded to the motor-compressor casing. In such an installation, however, the overload device senses an excessive current condition only, and does not sense excessive motor temperature. Furthermore, additional expense is involved in installation of the remotely located overload device and starting relay.

It is therefor desirable to provide inherent thermal overload protection, i.e., responsive to both temperature and current, for an explosion resistant motor, particularly an explosion resistant hermetic motor-compressor combination, and it is further desirable that thermal overload protection be provided by a commercially available thermal overload protector, simply mounted, along with a commercially available starting relay, in an explosion resistant housing readily attached to the casing of an explosion resistant motor.

SUMMARY OF THE INVENTION

The invention, in its broader aspects, provides an explosion resistant motor having a metal casing with a cluster of electrical terminals extending from a wall thereof and sealed thereto. A metal tubular member is sealingly attached to the casing wall, extends outwardly therefrom to an open end, and surrounds the motor terminal cluster. An inherent thermal overload device is provided along with means for mounting the device in the tubular member in heat transfer relation therewith so that the device responds to a combination of excessive casing temperature and motor current. Means is provided in the tubular member for electrically coupling one of the motor terminals to one of the overload terminals, and electrical leads are provided respectively connected to another motor terminal and another overload device terminal and having portions which extend outwardly through an opening in the side wall of the tubular member. Means are provided sealingly connected to the side wall around the opening therein for enclosing the lead portions, and means are provided for removably and sealingly closing the open end of the tubular member thereby to complete an explosion resistant enclosure for the overload device.

It is accordingly an object of the present invention to provide an improved explosion resistant mounting for a thermal overload protector for an explosion resistant motor.

Another object of the invention is to provide an improved explosion resistant mounting for a thermal overload protector and starting relay for an explosion resistant, hermetically sealed motor-compressor combination.

The above-mentioned and other features and object of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side, cross-sectional view showing the improved thermal overload mounting of the invention;

FIG. 2 is an end view of the thermal overload mounting clip employed in the system of FIG. 1;

FIG. 3 is a side view of the thermal overload mounting clip of FIG. 2;

FIG. 4 is an end view of the insulating sleeve employed in the system of FIG. 1; and FIG. 5 is a schematic view showing the invention.

DESCRIPTION OF THE PREFERRED EMBODIMENT

Referring now to the figures of the drawing, there is shown a portion of metal casing 10 for an explosion resistant motor, such as the casing for a hermetically sealed, motor-refrigeration compressor combination. Cluster 14 of electrical terminals 16, 17, 18 for the motor 19 housed in casing 10 extend through wall 20 of casing 10 and are sealed thereto in conventional fashion. Motor 19 includes conventional main and starting field windings 21, 23 connected to terminals 16, 17, 18 as shown in FIG. 5.

Section 22 of metal pipe, such as conventional cast iron pipe, has end 24 integrally connected to wall 20 of casing 10, as by welding at 26. Pipe 22 surrounds terminal cluster 14 and extends outwardly from wall 20 to threaded open end 28. Opening 30 is formed in the wall of pipe section 22 and pipe or conduit 32 is secured thereto as by welding at 34, so as to communicate with wall opening 30.

Conventional inherent thermal overload device 36 is provided including bimetallic element 37 (FIG. 5) and having cylindrical body portion 38 with electrical terminals 39, 40 extending therefrom, and enlarged portion 42. Overload mounting clip 44 is provided formed of suitable metal, such as stainless steel, and has annular portion 46 and resilient leg portions 48. Annular portion 46 of clip 44 embraces cylindrical portion 38 of thermal overload device 36 and is seated against enlarged portion 42. Each leg portion 48 of clip 44 has tab 50 formed therefrom extending inwardly resiliently to engage cylindrical portion 38 of overload device 36 thereby to retain the same in annular portion 46. Each leg portion 48 also has oppositely facing, outwardly extending tabs 52, 54 formed therefrom.

Clip 44 with inherent thermal overload device 36 positioned therein is inserted in open end 28 of pipe section 22 until tabs 52 engage end 56, tabs 54 on legs 48 resiliently engaging the inner surface of pipe 22 and inhibiting withdrawal of member 44 therefrom. It will be seen that inherent thermal overload device 36 is thermally coupled to casing 10 by metal clip 44 and pipe 22 and thus responds to excessive casing temperature.

Motor terminal 18 is electrically coupled to one terminal 40 of inherent thermal overload device 36 by lead 41, and conventional positive temperature coefficient resistance type (PTCR) starting relay 58, also disposed within pipe 22, is coupled across terminals 18, 19. Electrical leads 60, 61 are respectively connected to motor terminal 16 and the other terminal 39 of inherent thermal overload device 36 and extend outwardly through opening 30 in pipe section 22 and through pipe 32 to a remote source of energizing potential for the motor in casing 10 (not shown).

Sleeve 62 formed of suitable insulating material, such as Mylar, is coaxially positioned within pipe section 22 with its end 64 abutting casing 20 and surrounding motor terminal cluster 14, and its outer end 66 generally coextensive with end 56 of pipe 22. Insulating sleeve 62 is coaxially spaced from the inner wall surface of pipe 22, as at 68. Resilient leg portions 48 of clip member 44 extend in space 68 between insulating sleeve 62 and the inner wall surface of threaded end 28 of pipe 22. Insulating sleeve 62 has longitudinal slot 70 formed therein through which leads 60 extend. Conventional threaded pipe cap 72 is threaded on end 28 of pipe 22 and completes the explosion resistant enclosure for thermal overload device 36 and starting switch 58.

It will now be seen that the invention provides an extremely simple, explosion resistant mounting for a conventional inherent thermal overload device and starting relay which can be readily attached to the casing of an explosion resistant motor or motor-compressor combination.

While there have been described above the principles of this invention in connection with specific apparatus, it is to be clearly understood that this description is made only by way of example and not as a limitation to the scope of the invention.

What is claimed is:

1. In combination with an explosion-resistant motor having a metal casing with a cluster of electrical terminals extending from a wall thereof and sealed thereto: a metal tubular member having an open inner end attached to said wall by an integral connection, said tubular member extending outwardly from said wall to an open outer end, said inner end of said tubular member surrounding said terminal cluster in spaced relationship therewith; an inherent thermal overload device having terminals; means for mounting said device in said tubular member in heat transfer relation therewith whereby said device responds to excessive casing temperature; means in said tubular member for electrically coupling one of said motor terminals to one of said device terminals; electrical leads respectively connected to another motor terminal and another device terminal and having portions extending outwardly through an opening in the side wall of said tubular member; means sealingly connected to said side wall around said opening for enclosing said lead protions, and means for removably and sealingly closing said open end of said tubular member thereby to complete an explosion resistant enclosure for said overload device.

2. The combination of claim 1 wherein said tubular member is substantially cylindrical in cross-section, said mounting means substantially coaxially mounting said overload device in said tubular member adjacent said open end thereof.

3. The combination of claim 2 wherein said overload device includes a substantially cylindrical portion, said mounting means comprising a metal clip member having a central opening receiving said cylindrical portion of said device and a portion extending from said central portion and engaging said tubular member.

4. The combination of claim 3 wherein said extending portion of said clip member comprises a plurality of legs resiliently engaging the inner wall surface of said tubular member.

5. The combination of claim 4 wherein each of said legs has a plurality of tabs formed therefrom, at least one tab of each leg engaging said cylindrical portion of said overload device, at least one tab engaging the end of said tubular member thereby to limit entry of said legs into said open end, and at least one tab engaging said inner wall surface and facing toward said open end thereby to inhibit removal of said clip member.

6. The combination of claim 5 further comprising a sleeve of insulating material in said tubular member and spaced from the wall thereof, said sleeve surrounding said terminal cluster and having an open end generally coextensive with said open end of said tubular member, said cylindrical portion of said overload device extending at least partially into said open end of said sleeve, said clip member legs extending in the space between said sleeve and said inner wall of said tubular member.

7. The combination of claim 6 wherein said sleeve has a longitudinally extending slot formed therein for accommodating said electrical leads.

8. The combination of claim 7 wherein said enclosing means comprises a conduit sealingly secured to said wall opening and communicating with said opening therein.

9. The combination of claim 8 wherein said coupling means includes a starting relay, said sleeve surrounding said relay.

10. The combination of claim 9 wherein said tubular member comprises a section of pipe having an end welded to said casing wall, said closing means comprising a cap member threaded on said open end.

11. The combination of claim 9 wherein said relay is of the positive temperature coefficient resistance type.

* * * * *